United States Patent Office 3,697,239
Patented Oct. 10, 1972

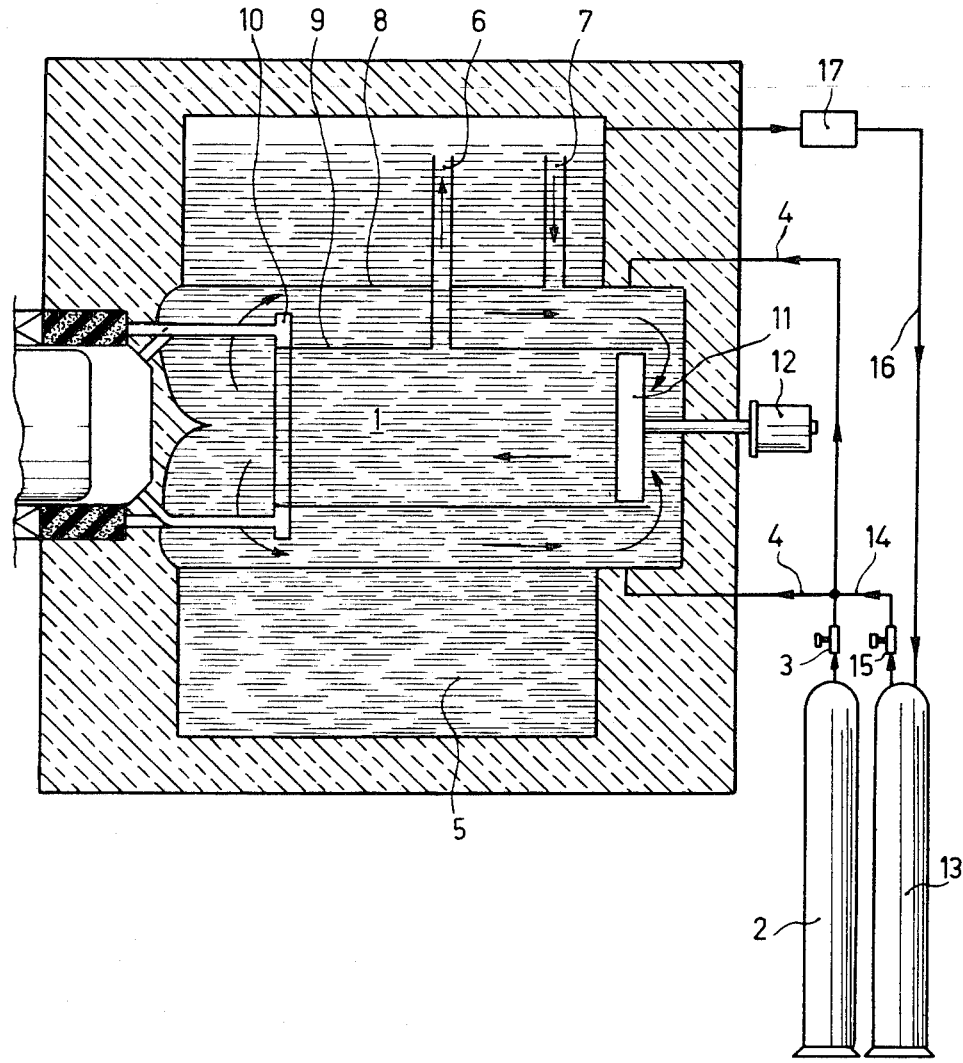

3,697,239
LITHIUM CONTAINING FUEL SUITABLE FOR PRODUCING CALORIFIC ENERGY BY REACTION WITH SF$_6$
Johann Schröder, Aachen, Germany, assignor to U.S. Philips Corp., New York, N.Y.
Filed Sept. 25, 1969, Ser. No. 860,978
Claims priority, application Netherlands, Sept. 30, 1968, 6813991
Int. Cl. F24j 1/00
U.S. Cl. 44—3 R
4 Claims

ABSTRACT OF THE DISCLOSURE

A lithium and calcium containing fuel producing calorific energy by reaction with sulfur hexafluoride.

---

The invention relates to a lithium containing fuel suitable for producing calorific energy in a chemical reactor, the fuel being reacted with sulphur hexafluoride.

A method of producing calorific energy is known from U.S. patent specification 3,325,318 in which in a chemical reactor lithium or an alloy of lithium is reached with SF$_6$. According to this patent specification, an alloy suitable for this purpose comprises at least 50% by weight of lithium, remainder aluminium, and/or up to 25% by weight of a metal from the group formed by sodium, potassium, beryllium, magnesium and calcium.

The reaction is performed in such a way that a solid reaction product containing lithium sulphide (melting point approximately 950° C.) and lithium fluoride (melting point 848° C.) is formed. According to this patent specification heat can be removed from the reactor by means of a working fluid flowing through ducts which are embedded in the stationary bed consisting of mainly lithium and solid reaction products of lithium and sulphur hexafluoride. A uniform reaction process and an efficient extraction of the reaction heat in the presence of solid reaction products is extremely difficult to realize.

The object of the invention is to provide a fuel which contains lithium and can be applied in a method for producing calorific energy, the reactor containing a liquid lithium alloy, whose reaction products with SF$_6$ being also predominantly liquid or being immiscible or substantially immiscible with the lithium alloy at the operating temperature (800° C.), the volume of the reacting mass remaining constant during the reaction or being variable between narrow limits.

According to the invention such a fuel is characterized in that it contains lithium and calcium in such a ratio that the fuel forms a eutectic mixture of lithium fluoride and calcium fluoride upon reaction with sulphur hexafluoride.

Lithium fluoride and calcium fluoride form an eutectic mixture of 4:1 in gram atoms. The eutectic melting point is 769° C. A great part of the sulphides formed during the reaction dissolves in the eutectic mixture of the fluorides. It is found that at temperatures between approximately 800 and 900° C. the specific volume of this molten mixture corresponds to the specific volume of the starting alloy. The combination of lithium and calcium in the ratio of 4:1 yields the largest quantity of energy when converting with SF$_6$ per unit volume at 850° C. as compared with all other elements and feasible combinations of elements.

The mixture of lithium and calcium according to the invention provides the advantage that calorific energy can be produced therewith in a temperature range between 800 and 900° C. by means of steps to be referred to hereinafter this temperature range can be extended to 700 to 900° C.

The said temperature range between 700 and 900° C. is particularly suitable for applying calorific energy to engines in which a working fluid flows through a thermodynamical circuit between an expansion space being at a high temperature and a compression space being at a low temperature. An example of such an engine is a hot-gas engine. Heat may be supplied to the engine by establishing contact between the heater of the hot gas engine, usually consisting of a system of tubes through which the medium flows on its way to and from the expansion space, and the liquid mass in the chemical reactor. A great efficiency in case of small dimensions of the heater is obtained if the calorific energy is available at approximately 800° C. In connection with the properties of the currently existing structural materials temperatures of more than 900° C. are less desirable for this purpose.

If desired, the heat can also be transferred by means of a heat transferring medium, for example, a liquid Na-K alloy which circulates in a system which at one end is in heat-exchanging contact with the chemical reactor and at the other end with the heater of the hot gas engine.

When using this method the deposition of salts formed during the reaction on those areas where heat is released by the mass reacting in the reactor is prevented. Such a deposition, which occurs if heat is released at a temperature below the softening point of the mixture of reaction products would impede the transfer of heat between the reacting mass and the system to which the heat must be transferred. In this method local overheating the chemical reactor can be avoided while the heat can be released uniformly and in a controlled manner, particularly when the liquid contents of the reactor circulate.

The salts formed in this method when using the fuel according to the invention, on the one hand and the metals lithium and calcium on the other hand are only mutually soluble to a slight extent. As a result the possibility is created of separating the liquid salts from the metal alloy, for example, by circulating the reacting mass between the actual reaction space and a sedimentation space which may also serve as a reserve container, the flow speed in the sedimentation space being chosen to be smaller than the flow speed in the rest of the system. This provides the advantage that the reaction speed can be maintained substantially constant at a constant supply of sulphur hexafluoride to the reactor because the concentration of metal in the reactor remains substantially constant for a considerable part of the time required for full conversion.

Since the specific volume of the mixture of the reaction products does not essentially differ from the specific volume of the alloy of lithium and calcium in the atomic ratio of 4:1, which surprisingly coincides with the eutectic composition of the formed fluorides, the possibility is provided of causing the chemical reactor to function independently of outside influences.

As already noted, the fuel according to the invention is particularly suitable for supplying heat (calorific energy) at temperatures between 800 and 900° C. After the reaction has been completed the melting heat becomes available when cooling at 769° C.

It may be advantageous to add to the lithium-calcium alloy up to a total of 30 atom percent of sodium and/or magnesium. The usable temperature range may be, for example, extended to approximately 700 to 900° C. with a fuel which in addition to lithium and calcium in the atomic ratio of 4:1 contains up to 30 atom percent as calculated on the ultimate alloy of an alloy consisting of 73 atom percent of sodium and 27 atom percent of magnesium. Alloys which are chosen within this range neither essentially vary their volume upon conversion with SF$_6$.

The mixture of fluorides which is formed during conversion of an alloy comprising

| | Atom percent |
|---|---|
| Lithium | 56 |
| Calcium | 14 |
| Sodium | 21.9 |
| Magnesium | 8.1 | with $SF_6$ has completely melted above approximately 650° C.

The quantity of calorific energy released per unit volume of such a sodium and magnesium containing alloy is, however, smaller than that of an alloy comprising lithium and calcium only.

An alloy comprising lithium and calcium in the atomic ratio of 4:1 provides 2.9 kcal. at a temperature of 850° C. of the melt and a temperature of 20° C. of the $SF_6$ reacting therewith per $cm.^3$ of alloy together with liquid $SF_6$. This is found to be surprisingly equal to the quantity of calorific energy which can be obtained with lithium only per unit volume under the same circumstances and is found to be more than is obtained under the same circumstances with the metals: sodium (1.6 kcal.), potassium (0.9 kcal.), magnesium (2.5 kcal.), calcium (2.7 kcal.), aluminum (2.2 kcal.) and lanthanum (2.2 kcal.). The volume decreases, however, when reacting lithium only with $SF_6$.

It is alternatively possible to utilize the melting heat of the eutectic mixture of fluorides at 769° C.

A small volume increase of the reacting mass may be brought about by adding magnesium to the lithium-calcium alloy, a small decrease can be obtained by adding sodium to the lithium-calcium alloy. Under certain circumstances a small essential volume increase or decrease (of a few percents) may be desirable. However, when sodium is present, one of the essential advantages of the lithium-calcium alloy, namely the possibility to handle this alloy in air, is largely lost.

The formation of fluorides is especially emphasized in the foregoing, but also sulphides are formed during the reaction in accordance with:

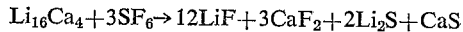

It was, however, found in practice that the greater part of the sulphides dissolves in the molten fluorides, for the remainder they appear to occur finely dispersed in the metal and fluoride melts.

Furthermore it has been found that for obtaining the desired effect it is not necessary for the ratio between lithium and calcium in the alloy to correspond exactly to the ratio between lithium and calcium in the eutectic mixture.

Alloys having the composition of 41% by weight ±3% by weight of lithium, remainder calcium and the usual impurities, in practice usually a total of less than 1% by weight, were found to be also usable. The fluorides formed during the reaction with sulphur hexafluoride mainly form an eutectic mixture, a slight excess, for example, a few percents by weight of one of the two fluorides is finely dispersed if separation occurs and generally it does not essentially disturb in these slight quantities (melting point of lithium fluoride is 848° C., that of calcium fluoride is 1418° C.).

The fuel may be pressed into mouldings in the form of a metal powder mixture. Also an alloy can first be prepared which is subsequently formed into mouldings. The mouldings may be used to fill the reactor. The reactor may alternatively be filled with a melt. A homogeneous melt is obtained at temperatures of 580° C. and more.

In order that the invention may be readily carried into effect, an embodiment thereof will now be described in detail, by way of example, with reference to the accompanying drawing which is a diagrammatical cross-section of a chemical reactor in which the fuel according to the invention can be used, in an advantageous manner.

The reactor shown in the figure comprises a reaction space 1 which is filled with a mixture or an alloy of lithium and calcium (4:1 in gram atoms). The container 2 contains sulphur hexafluoride. The container 2 communicates with the reaction space 1 through a control cock 3 and a number of supply ducts 4 two of which are shown in the figure. The reaction space 1 communicates through the exhaust duct 6 and the supply duct 7 with a second space, hereinafter referred to as the container 5 which is likewise filled with a mixture or alloy of lithium-calcium in the ratio indicated above and which surrounds the reaction space 1. The reaction space 1 comprises a cylindrical container 8 in which a cylinder 9 is placed concentrically. Cylinder 9 is open at either end and does not contact the end walls of the cylindrical container 8. The end of cylinder 9 adjoins the crown of heater tubes 10 of a hot gas engine. An aperture is provided at the other end between the end of the cylinder 9 and the cylindrical container 8. A circulation conduit is obtained in this manner in which a pump 11 driven by the electric motor 12 shown diagrammatically is placed. The reaction space 1 is in heat-exchanging contact with the container 5. Container 13 contains an inert gas, for example, argon and communicates with the duct 4 through the duct 14 and the control cock 15. The container 13 also communicates with the reserve container 5 through the duct 16 and the compressor 17.

The reactor operates as follows: Initially, the reactor is at a temperature at which the mixture or the alloy of lithium and calcium in the reaction space 1 and the container 5 is solid. The metal mass is melted, for example, by electrical heating (not shown). Subsequently, the pump 11 is put into operation and flow occurs in the reaction space as shown by the arrows therein. Subsequently the control cocks 3 and 15 are opened and a constant flow of sulphur hexafluoride mixed under its natural pressure with the inert gas is introduced into the reaction space, where a reaction takes place immediately in accordance with

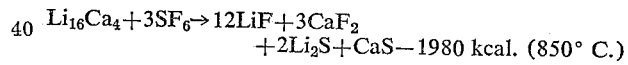

The heat released during the reaction is transferred to the heater tubes 10. Part of the formed reaction products and non-reacted alloy of lithium and calicum flows through the cylinder 9 to the left, flows around the heater tubes 10 and flows subsequently to the right through the space between the cylinder 9 and the wall of the cylindrical space 8, another part of the formed reaction products and non-reached alloy leaves the reaction space through the duct 6 and comes into the reserve container 5. Since the flow speed in the reserve container is smaller than that in the reaction space 1, the formed reaction products, whose specific weight is approximately twice larger than that of the metal alloy, can be separated in this space. The specifically lighter metal alloy flows back into the reaction space through the duct 7.

The inert gas brought into the reaction space together with the $SF_6$ is collected in the reserve container, whence it is pumped back through the duct 16 and the compressor 17 into the container 13. This serves to prevent molten alloy and/or reaction products from coming in the duct 4 upon discontinuation of the $SF_6$ supply.

By passing a portion of the alloy and reaction products at a slower speed through the reserve container 5 and by causing the reaction products to be separated in that container, the reaction circumstances in the reaction space are kept substantially constant for a considerable part of the time required for full conversion. Only after such a quantity of alloy has been converted that the reserve container 5 is substantially filled with the reaction products, the concentration of reaction products in the reaction space 1 steadily increases so that the conversion speed of the alloy with sulphur hexafluoride is reduced. By admitting comparatively more sulphur hexafluoride, the reaction speed can again be increased. All this may be controlled automatically, for example, by means of a gas cock in duct 4 which is controlled by a thermostat in such a manner that the temperature in the reaction space remains constant.

It is evident that a maximum efficiency is obtained with the chemical reactor if the volume of the reacting mass remains constant as much as possible during the reaction, which is possible when using the fuel according to the invention.

What is claimed is:

1. A fuel system suitable for reacting a fuel and an oxidant to generate heat in a heat generator, the oxidant consisting essentially of sulfur hexafluoride and the fuel containing calcium and lithium in a ratio such that upon reaction with the sulfur hexafluoride mainly an eutectic mixture of lithium fluoride and calcium fluoride is formed.

2. The fuel system of claim 1 wherein the fuel consists essentially of an alloy of 41±3% by weight of lithium and the remainder calcium.

3. The fuel system of claim 1 wherein the fuel consists essentially of an alloy of lithium and calicum in a ratio in gram atoms of about 4 to 1 and up to 30 atoms percent of sodium or magnesium.

4. The fuel system of claim 1 wherein the fuel is in the form of a mould.

References Cited

UNITED STATES PATENTS 3,325,318    6/1967    Paulinkonis _____ 149—109

CARL F. DEES, Primary Examiner

U.S. Cl. X.R.

149—109